(12) United States Patent
Byers et al.

(10) Patent No.: US 7,146,244 B2
(45) Date of Patent: Dec. 5, 2006

(54) METHOD OF GENERATING CONTROL COMMANDS IN A DISTRIBUTED MASS DATA STORAGE LIBRARY NETWORK

(75) Inventors: Daniel J. Byers, Parker, CO (US); Bruno H. Hald, Highlands Ranch, CO (US); Carsten H. Prigge, Englewood, CO (US); Scott M. Rockwell, Aurora, CO (US); Joerg Stohrer, Greenwood Village, CO (US)

(73) Assignee: Advanced Digital Information Corporation, Redmond, WA (US)

(*) Notice: Subject to any disclaimer, the term of this patent is extended or adjusted under 35 U.S.C. 154(b) by 0 days.

(21) Appl. No.: 10/371,176

(22) Filed: Feb. 19, 2003

(65) Prior Publication Data

US 2004/0221104 A1    Nov. 4, 2004

Related U.S. Application Data

(63) Continuation of application No. 09/347,492, filed on Jul. 2, 1999, now abandoned.

(51) Int. Cl.
*G06F 7/00* (2006.01)
(52) U.S. Cl. .................. 700/218; 700/213; 700/214
(58) Field of Classification Search .............. 700/218, 700/213, 214
See application file for complete search history.

(56) References Cited

U.S. PATENT DOCUMENTS

| | | | |
|---|---|---|---|
| 4,864,438 A | 9/1989 | Munro | |
| 5,121,483 A | 6/1992 | Monahan et al. | |
| 5,197,055 A | 3/1993 | Hartung et al. | |
| 5,303,214 A | 4/1994 | Kulakowski et al. | |
| 5,673,381 A | 9/1997 | Huai et al. | |
| 5,768,141 A * | 6/1998 | Hanaoka et al. | 700/214 |
| 5,819,309 A | 10/1998 | Gray | |
| 5,956,301 A * | 9/1999 | Dimitri et al. | 369/30.31 |
| 5,983,318 A | 11/1999 | Wilson et al. | |
| 6,038,490 A * | 3/2000 | Dimitri et al. | 700/214 |
| 6,052,341 A * | 4/2000 | Bingham et al. | 711/112 |
| 6,161,058 A * | 12/2000 | Nishijo et al. | 700/218 |
| 6,356,803 B1 | 3/2002 | Goodman et al. | |

* cited by examiner

*Primary Examiner*—Khoi H Tran
(74) *Attorney, Agent, or Firm*—Perkins Coie LLP

(57) ABSTRACT

A method of generating command instructions for a distributed mass data storage library comprises the steps of receiving an operator request from an operator, determining at least one command for at least one intelligent library component in response to the operator request, forming at least one command message containing the at least one command, and sending the at least one command message to the at least one intelligent library component for carrying out actions requested by the operator.

20 Claims, 4 Drawing Sheets

METHOD OF GENERATING CONTROL COMMANDS IN A DISTRIBUTED MASS DATA STORAGE LIBRARY NETWORK

RELATED APPLICATION

This continuation patent application is related to abandoned U.S. application entitled SYSTEM AND METHOD OF DISTRIBUTED MASS DATA STORAGE LIBRARY NETWORK, Ser. No. 09/347,494, Jul. 2, 1999. This continuation application claims the benefit of U.S. patent application Ser. No. 09/347,492, filed on Jul. 2, 1999, now abandoned which is incorporated herein in its entirety by reference.

TECHNICAL FIELD OF THE INVENTION

This invention is related in general to the field of mass data storage libraries. More particularly, the invention is related to a method of generating control commands in a distributed mass data storage library network.

BACKGROUND OF THE INVENTION

A mass data storage library is a collection of data storage elements for storing media that record data, data transfer elements for reading the media, and medium transport elements for moving the media between the data storage elements and data transfer elements. The mass storage library is used to store large volumes of data which may be retrieved quickly and efficiently. Examples of data media include cassettes, floppy disks, diskettes, optical disks, compact disks, and tapes which reside in data cartridges; examples of data storage elements include fixed storage shelves or racks and rotatable storage towers; examples of data transfer elements include cartridge processors which are operable to access (read/write) the data media in the cartridges. The medium transport element is typically called an accessor, which includes two primary components: the transport mechanism and the gripper assembly.

In the conventional mass data storage library, a library controller is used to control all library activities. Motion is initiated by a host or operator request to the library controller, which evaluates sensor input and issues motion control signals to the various library hardware elements.

SUMMARY OF THE INVENTION

Accordingly, there is a need for a mass data storage library control architecture that minimizes the bulky unmanageable point-to-point wiring harness and the centralized architecture of conventional systems.

In one aspect of the invention, a method of generating command instructions for a distributed mass data storage library comprises the steps of receiving an operator request from an operator, determining at least one command for at least one intelligent library component in response to the operator request, forming at least one command message containing the at least one command, and sending the at least one command message to the at least one intelligent library component for carrying out actions requested by the operator.

In another aspect of the invention, a method of commanding operation by intelligent library components in a distributed mass data storage library includes the steps of receiving an operator request at a master library controller, and determining at least one command for effecting the received operator request by one or more intelligent library components coupled to the master library controller via a network. The master library controller further forms at least one command message containing the at least one command and transmits the at least one command message to the one or more intelligent library components. The one or more intelligent library components then acts in response to receiving the at least one command message in accordance with the operator request.

BRIEF DESCRIPTION OF THE DRAWINGS

For a better understanding of the present invention, reference may be made to the accompanying drawings, in which.

DETAILED DESCRIPTION OF THE INVENTION

It has been recognized that conventional library controllers such as ones described above encounter three primary problems. First, the wiring point-to-point harness creates problems in library expansion and large size libraries. Second, the centralized controller architecture creates a bottleneck in controlling all the hardware elements of the library. Third, because the centralized library controller architecture must retain intimate knowledge about each hardware element it controls, the controller configuration becomes complex and difficult to change or upgrade.

The conventional library controller requires extensive wiring to each library hardware element to send/receive motion control signals and receive various sensor inputs. Therefore, each library hardware element generally requires multiple wires or electrical connections to the library controller. The library controller wiring harness places severe limitations on the extensibility and overall library configuration of the mass data storage library due to fixed electrical connectivity provisions, wiring length considerations, and mechanical movement of the wiring harness. Furthermore, the wiring harness must be extended or replaced when the data storage library is expanded or changed in any way. For example, in order to add a data storage tower, several I/O ports on the library controller must be allocated and physically linked to the data storage tower via separate electrical lines. Therefore, the conventional library architecture with fixed point-to-point wiring connections is too rigid and not easily adaptable to mass data storage libraries of any substantial size. Such an architecture is also not sufficiently flexible to adapt to scalable library size and configurations to meet changing needs.

The centralized library controller architecture also becomes a cause for bottleneck in large sized libraries. Because of the large number of I/O and low level communications the library controller must manage and control, a fast and powerful central processing unit (CPU) becomes a necessity. Even so, slower speed in large libraries is inevitable.

Furthermore, the conventional mass data storage library controller is required to retain information on the hardware elements it controls. For example, the controller must know which I/O port to use, which motor to actuate, and for how long in order to move the medium transport element to a specific location. Such a control protocol is difficult to manage, and to upgrade or change.

Figure 1:
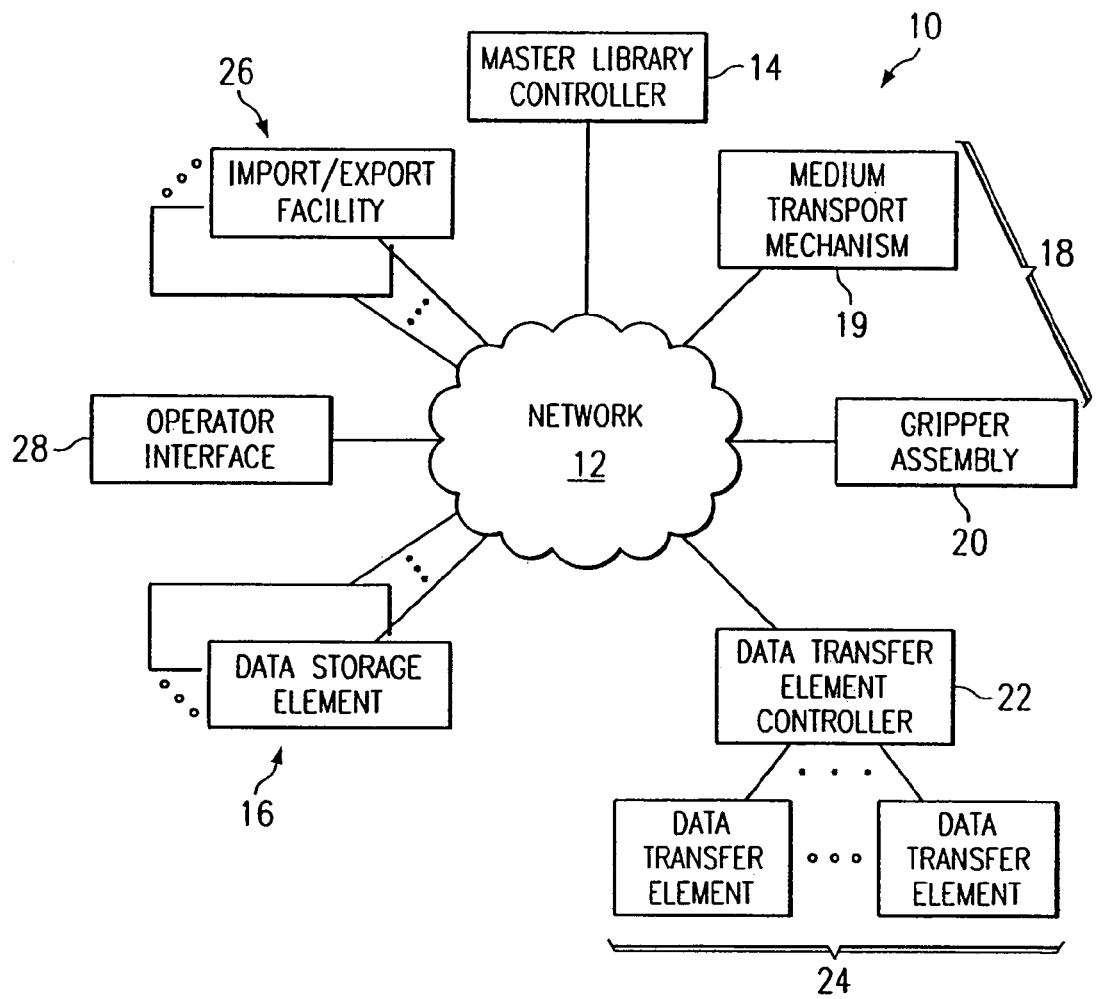
FIG. 1 is a simplified top-level block diagram of a mass data storage library system constructed according to an embodiment of the present invention.

FIG. 1 is a simplified top-level block diagram of a mass data storage library system 10 constructed according to an embodiment of the present invention. Library system 10 includes a network 12 such as token ring, local area network (LAN), Ethernet, fiber optic, controller area network (CAN), and the like that links the intelligent library components together. Network 12 may couple the library components in any suitable configuration, such as ring, tree, linear, etc. A communications protocol, such as the CAN serial communications bus protocol defined by the International Standard Organization (ISO), TCP/IP, or other suitable protocols may be used to define and provide for transmission of data on network 12.

Network 12 is linked to a master library controller 14, which is a central processing unit (CPU) or computing platform that distributes command tasks among all the intelligent library components involved in the execution of the command request. Multiple movable data storage elements 16, such as rotatable storage towers or movable shelving units, are coupled to master library controller 14 via network 12. Mass data storage library 10 may also include fixed data storage elements (not shown) which typically need not be linked to master library controller 14.

Also coupled to network 12 is one or more medium transport elements 18, which may each include two primary components, a medium transport mechanism 19 and a gripper assembly 20, that may be separately coupled to master library controller 14 via network 12. Although not shown in particularity, gripper assembly 20 is coupled to medium transport mechanism 19, which may move along predetermined paths defined by a track and the like to carry gripper assembly 20 from one location to another according to the commands issued by master library controller 14. Gripper assembly 20 is used to get the data storage media once properly situated, to hold the data storage media during transport, and to put the data storage media in a specified location.

Network 12 also links a data transfer element controller 22 to master library controller 14. Data transfer element controller 22 is coupled to one or more data transfer elements 24, whose task is to read from and write to various types of data storage media delivered thereto by medium transport element 18. Data transfer elements 24 may be data cartridge processors which function to retrieve data from or record information to data cartridges. Data cartridges may include different types of recording media such as cassettes, compact disks, optical disks, tapes, and the like.

Mass data storage library system 10 also includes an import/export facility 26, which is used to add and remove data media to and from the collection in library system 10. Import/export facility 26 also interfaces with medium transport element 18 to receive data media therefrom or provide data media therefor.

An operator interface 28 may also be coupled to master library controller via network 12. Operator interface 28 may be a computer terminal, personal computer, computer workstation, touch panel or any suitable device with a display and means to receive data input from an operator, such as a keyboard, mouse, touch pad, touch panel, etc. Operator interface 28 may provide text or a graphical interface to convey information about library system 10, such as current status, error flags, error processing. Further, operator interface 28 may provide menus, pull-down menu selections, clickable buttons, tool bars, and other ways to solicit and receive input from the operator, such as operator requests. Operator interface 28 may include one or more additional operator interfaces which may be linked to network 12 remotely via radio wave, modem, dial-up, Internet, World Wide Web, SCSI (small computer systems interface) and other suitable connections. For example, an operator interface may communicate with master library controller 14 via a SCSI connection and convey operator or host application software requests thereby.

Constructed in this manner, master library controller 14 is operable to receive operator requests from the operator via operator interface 28. Operator requests may be high-level commands in the form of "LOAD CARTRIDGE 128", "READ CARTRIDGE 128", "MOVE CARTRIDGE 128 TO CELL 200", "MOVE CARTRIDGE FROM CELL 100 TO CELL 200", "EJECT CARTRIDGE 100", "IMPORT CARTRIDGE 101", for example. Master library controller 14 is operable to intelligently instruct, in parallel, the various intelligent library components that must act in concert to carry out the operator request. For example, master library controller 14 may determine that a logical cell number 100 may house cartridge 128, and that cell number 100 is assigned to storage tower C. It also determines that data transfer element X is currently available to accept a data cartridge. If more than one medium transport element is part of library system 10, then master library controller 14 also makes a determination as to which medium transport element is currently available to make the transport. Then master library controller 14 may issue specific commands to each intelligent library component. For example, it may instruct data storage tower C to present cell number 100. To carry out the instruction, data storage tower C rotates until cell number 100 is oriented so that it is accessible to medium transport element 18. Master library controller 14 may also instruct medium transport element 18 to move to storage tower C, and at the same time, instruct gripper assembly 20 to open its clamps, fingers or gripping mechanism to be ready for grasping the data cartridge. While master library controller 14 is carrying out the first operator request of loading a particular data cartridge, it may simultaneously carry out additional operator requests in parallel. Compare this to conventional systems where the library controller must retain intimate details of each hardware component and give very specific detailed instructions. For example, instead of telling a data storage tower to "HOME" to return to a predetermined initial position now made possible by the present invention, the library controller must generate an electrical signal on a specific wire connected to the motor of the data storage tower for a computed amount of time or until it receives a signal from the data storage tower that the desired orientation has been reached.

Figure 2:
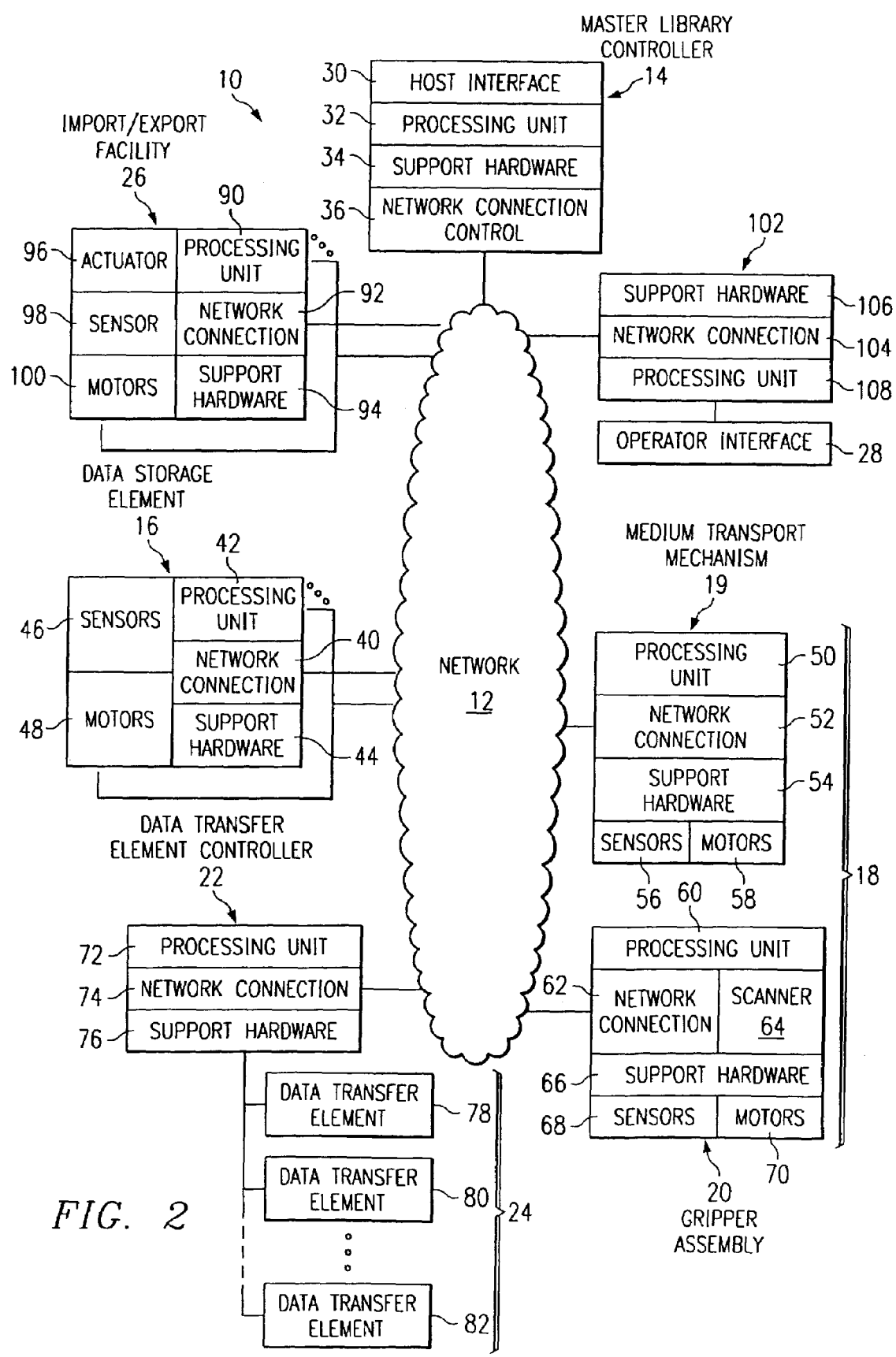
FIG. 2 is a more detailed block diagram of the mass data storage library system constructed according to an embodiment of the present invention.

FIG. 2 is a more detailed block diagram of the mass data storage library system 10 constructed according to an embodiment of the present invention. An exemplary embodiment of master library controller 14 includes a host interface for interacting and communicating with operator interface 28. Master library controller 14 further includes a processing unit 32, support hardware 34, and a network connection controller 36. Processing unit 32 provides the computing resources for master library controller 14, which may be of any computing power suited to the size and demands of library system 10. Processing unit 32 receives operator requests from operator interface 28 and issues instructions or commands to intelligent library components linked by network 12 to carry out the operator requests. Processing unit 32 may also execute failure analysis and supervisory functions. Support hardware 34 may include any required hardware components, such as I/O ports, random access memory or other data storage, etc. Network connection controller 36 may include hardware and software needed to manage and control data transmission on network 12. For example, software for network connection controller 36 may be responsible for functionalities in the lower layers, such as data link and physical layers, in the OSI layered network architecture.

Intelligent data storage elements 16 each includes a processing unit 42 which is a component of the distributed processing architecture of library system 10. Processing unit 42 makes data storage element 16 an intelligent library component which participates in performing decision making, error analysis, and other tasks to carry out the operator requests from the operator. Data storage element 16 also includes a network connection 40 which couples element 16 to network 12 and performs lower layer network functions. Support hardware 44 of data storage element 16 may include memory and any other devices. Data storage element 16 also includes sensors 46 and motors 48. Sensors 46 may be used to properly position and orient medium transport element 18 to enable gripper assembly 20 to reach for and accurately grasp the targeted data cartridge housed within data storage element 16. Sensor 46 may include optical sensors, bar code scanners, cameras, and any other suitable means of providing feedback to align the medium transport element. Further, sensors 46 may also be used to provide feedback regarding the movement of the data storage element itself. Motors 48 drive actuators which provide one or more axes of movement of data storage element 16. For example, storage towers are generally rotatable about a central vertical axis.

Intelligent medium transport element 18 includes an intelligent medium transport mechanism 19 and intelligent gripper assembly 20. Medium transport mechanism 19 includes a processing unit 50, network connection 52, support hardware 54, sensors 56 and motors 58. Processing unit 50 performs decision making, error analysis, and other tasks to carry out the commands issued by master library controller 14. Network connection 52 provides for lower layer network functions to enable medium transport mechanism 19 to communicate with master library controller 14 and other library components. Support hardware 54 may include memory and any other necessary device or components. Sensors 56 of medium transport mechanism 19 may include optical sensors, bar code scanners, cameras and other means of receiving feedback regarding the location, position and/or orientation of medium transport mechanism 19. Motors 58 drive the actuators used to move medium transport mechanism 19 from one location to another, such as from a first predetermined position in front of a data storage element 16 to a second predetermined position in front of a data transfer element 24.

Gripper assembly 20 includes the mechanism that is used to reach for, grasp and then hold a data cartridge or any other data storage media during transport. Gripper assembly 20 includes a processing unit 60, which shares processing tasks with master library controller 14 and performs certain decision making and error analysis functions. Gripper assembly 20 also includes a network connection 62 provides for the interface to transmit data to and receive data from network 12. A scanner 64 may be a bar code scanner which aids in the locating, positioning and orientation of gripper assembly 20 with respect to data cartridge cells, data transfer element cartridge slots, and other locations into which the gripper must reach to get or put a data cartridge. Although scanner 64 is shown as part of gripper assembly 20, it may be alternatively coupled more less directly to network 12. Other sensors 56 may also be included to provide other position and orientation feedback. Gripper assembly 20 also includes support hardware 66 which may include memory and/or other hardware devices and components. Motors 70 of gripper assembly 20 drive the actuation of the gripper to enable it to open and close its fingers to rotate the gripper, and to extend and retract the grippers to reach to get and put the data cartridges.

Intelligent data transfer element controller 22 is also coupled to master library controller 14 via network 12. Data transfer element controller 22 may include a processing unit 72 which shares processing tasks with master library controller 14 such as decision making and error analysis in the management and control of data transfer elements 78–82. Data transfer element controller 22 also includes a network connection 74 which interfaces with network 12 to receive data that are addressed therefor. Support hardware 76 may include any necessary hardware and couples data transfer elements 78–82 to data transfer element controller 22. Data transfer elements 78–82 may include data cartridge processors, tape drives, and other devices which are operable to read and write the various types of data storage media in library system 10.

Import/export facility 26 includes a processing unit 90 that is part of the distributed control network architecture of library system 10. Processing unit 90 performs decision making, error processing, and other tasks to carry out the instructions from master library controller 14 in response to operator requests entered by the operator. Import/export facility 26 also includes a network connection 92 which supports the network protocol implemented on network 12 to receive data. Support hardware 94 may include any necessary devices and components. Import/export facility 26 further includes actuators 96, sensors 98, and motors 100. Actuators 96 and motors 100 enable import/export facility 26 to be rotated or otherwise oriented a certain way in order to accept or eject data media into or from the library.

Coupling operator interface 28 and network 12 is an intelligent network interface 102, which may include a network connection 104, support hardware 106, and processing unit 108. Intelligent network interface 102 enables operator interface 28 to communicate with master library controller 14 and other intelligent library components via network 12. Intelligent network interface 102 may be a common network interface module that is incorporated into all library components to enable network communications, decision making capabilities, failure analysis, and other functions.

Figure 3:
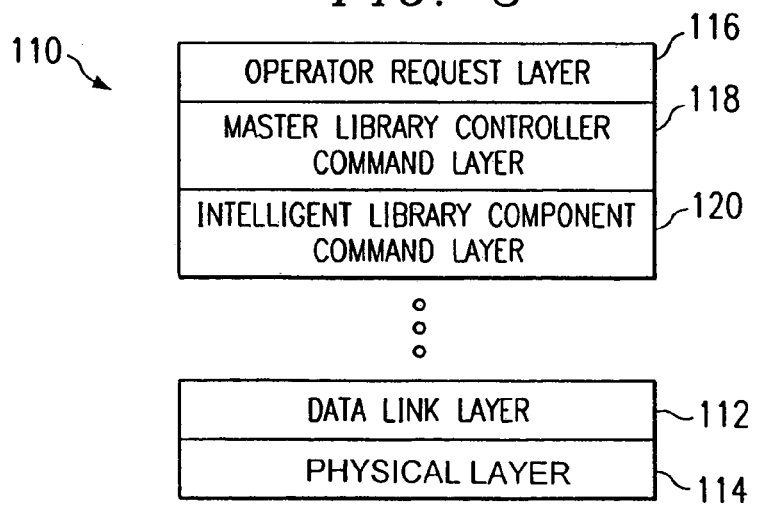
FIG. 3 is a diagram of a layered command architecture according to the teachings of the present invention.

FIG. 3 is a diagram showing the layered architecture 110 of an exemplary embodiment of the library system. Data link layer 112 and physical layer 114 are the lowest layers of the layered architecture, which are responsible for the protocol of transmitting data over network 12. For example, layers 112 and 114 may be responsible for receiving a data packet, stripping off the destination address, and providing the data contained in the packet to the upper layers. The upper layers are abstraction layers that removes the need for the operator or the master library controller to know specific information about the library components, such as the location of the library components or how a library component accomplishes certain tasks. The uppermost layer may be an operator request layer 116, which provides a definition of a plurality of operator requests that an operator may issue at the operator interface. The operator requests may include one or more parameters that are also supplied by the operator. The next layer is a master library controller command layer 118, which interprets the operator requests and generates one or more command messages to carry out the operator request. Master library controller command layer is operable to break down the operator request into lower level commands to specific intelligent library components. The master library controller issues the command messages to the intelligent library components, which respond by generating or receiving one or more component level commands or electrical signals to devices such as actuators and motors, and receiving inputs from sensors such as scanners and optical sensors. Abstraction layer 120 is responsible for taking a master library controller command and interpreting it into the electrical signals needed to accomplished the requested tasks.

Figure 4A:
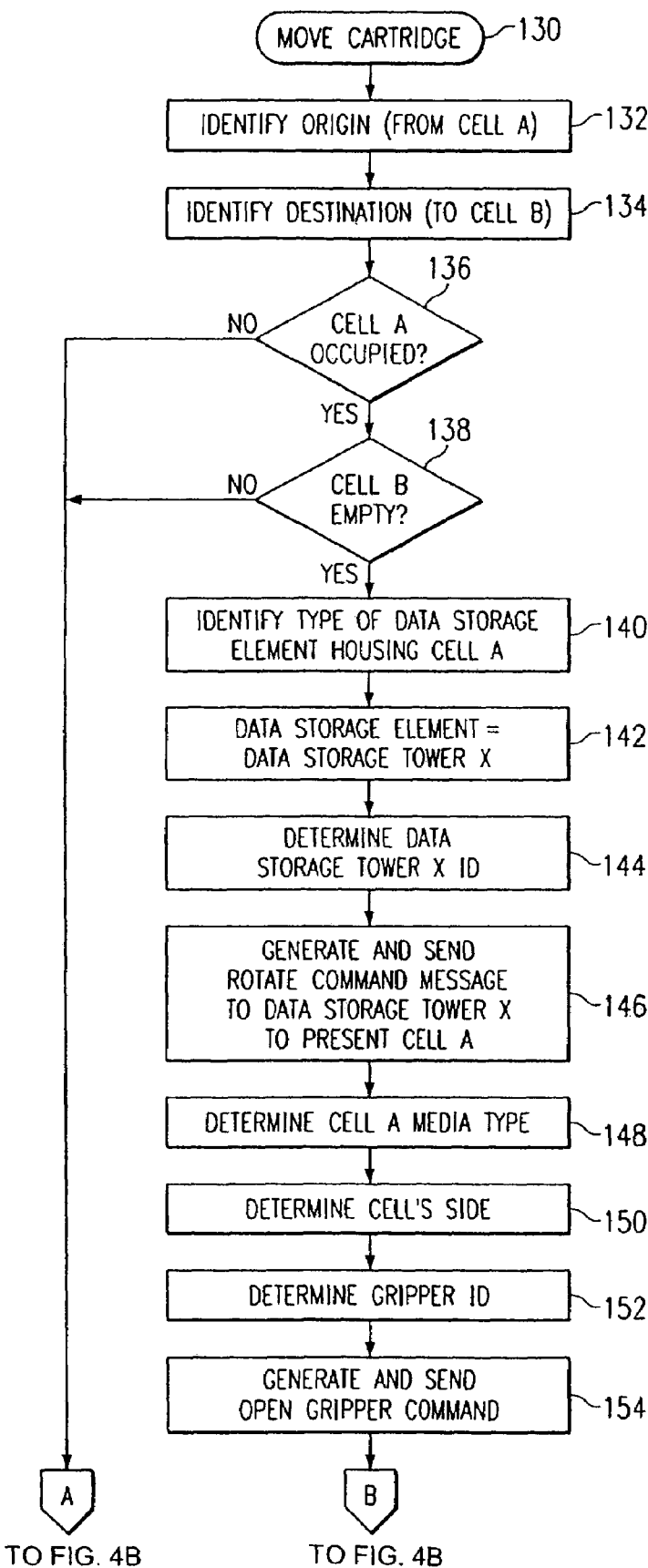
FIGS. 4A and 4B are flowcharts of an exemplary move data cartridge process according to an embodiment of the present invention.
Figure 4B:
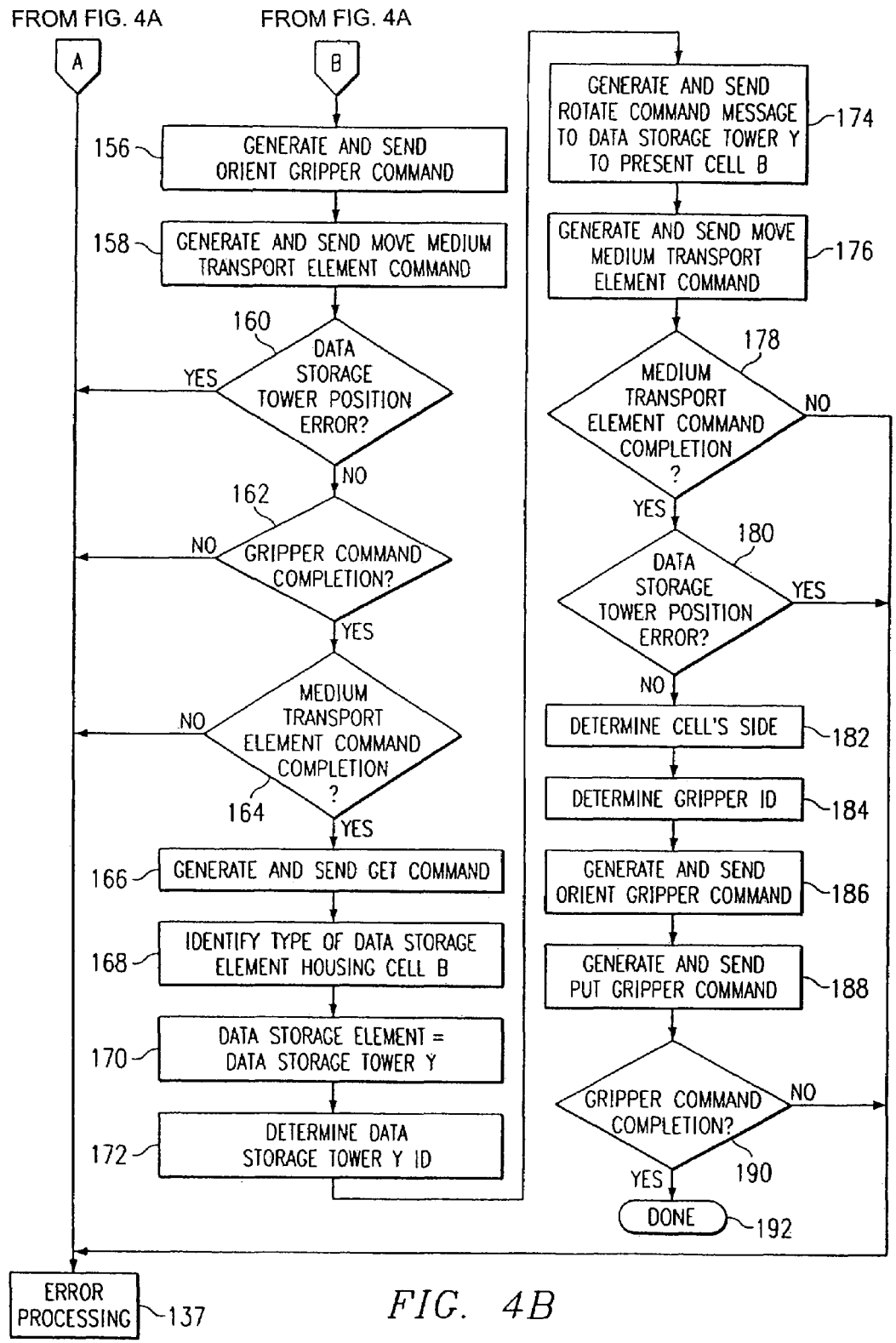

FIGS. 4A and 4B are flowcharts of an exemplary move data cartridge process 130 as performed by mass data storage library system 10 constructed according to an embodiment of the present invention. Assume that an operator issued a request such as "MOVE cartridge from cell 100 to cell 200" at operator interface 28. Alternatively, the operator request may be of the type "MOVE cartridge 123 to cell 200", which requires another layer of abstraction since master library controller 14 then must first look up the location of cartridge 123. This operator request may be input as text, or entered by selecting from a list of operator request choices and providing the cell IDs as parameters. Operator interface 28 sends the operator request to master library controller 14. In blocks 132 and 134, a determination is made as to the origin and destination of the MOVE operator request. Cell A, the origin, is determined to be cell 100, and cell B, the destination, is determined to be cell 200. Thereafter in blocks 136 and 138, a determination is made as to whether cell A (cell 100) is currently occupied and cell B (cell 200) is currently empty. This decision may be made by consulting a look up table that lists all the cells in the library system and the content of each cell. If cell A is occupied and cell B is empty, then the type of data storage element that contains cell A is identified in block 140. In this scenario, the data storage type is a particular data storage tower, as shown in block 142. In block 144, the data storage tower identifier is determined. Again, this may be performed by using the same or a different lookup table. In block 146, a command message is generated and sent to the data storage tower housing cell A that requests it to present cell A. By requesting it to present cell A, the processing unit in data storage tower must first determine its current orientation by receiving sensor inputs. Then the processing unit in data storage tower determines how long and in which direction to rotate in order to present cell A so that it may be accessed by the gripper assembly. The processing unit in data storage tower may also continuously receive sensor inputs in order to determine when to halt the rotation. While data storage tower is acting on the PRESENT command, master library controller 14 continues in block 148 to determine the media type of the cartridge stored in cell A. In block 150, the cell's side is determined. The media type and the cell's side are information used to adjust the gripper position or orientation. The gripper's identifier is determined in block 152. An OPEN command is generated and sent to the gripper assembly, as shown in block 154. A second command requesting the gripper to move to the cell's side is also generated and sent to the gripper assembly, as shown in block 156. This command may request the gripper to position or orient itself to be ready for grasping the cartridge in cell A. In block 158, a MOVE command is generated and sent to the medium transport mechanism. One or more parameters in the MOVE command provide information on the new location of the medium transport mechanism. The master library controller may simply identify the destination library component, such as data storage tower X, and the medium transport mechanism processing unit is responsible for determining where data storage tower X is and what it must do to position its associated gripper assembly at a location so that it may reach and grip the data cartridge in cell A. It may be seen that these commands may be received by the intelligent library components and performed simultaneously.

In blocks 160–164, master library controller 14 determines whether the commands it issued to the various intelligent library components have been carried out without errors unresolved by the components themselves. Master library controller 14 may look at the response messages it received from each library component to determine if any unresolved error occurred in positioning the library components. If all commands were executed and no error occurred, then it generates and sends a GET command to the gripper assembly, as shown in block 166. When the gripper has the data cartridge securely held, then it is ready to be moved. In blocks 168 and 170, the type of data storage element housing the destination cell B is determined to be another data storage tower Y. Data storage tower Y's identifier is determined, as shown in block 172. A PRESENT command message requesting data storage tower Y to present cell B is generated and sent to data storage tower Y, as shown in block 174. Upon receiving this command message, data storage tower Y rotates or otherwise orients itself so that cell B becomes accessible.

In block 176, a MOVE command message is generated and sent to the medium transport element to request that it moves from data storage tower X to data storage tower Y. Again, because of distributed processing, the master library controller need not know where data storage tower Y is located, or where it is located with respect to data storage tower X, the intelligence needed to make these determinations is contained within the processing unit of the medium transport mechanism. In block 178, the master library controller determines whether the medium transport successfully completed the MOVE command. The master library controller may do this by looking at the content of a response message from the medium transport mechanism indicates that no error was encountered. Further, the master library controller also determines whether data storage tower Y was successful in presenting cell B, as shown in block 180. A determination is then made regarding the cell's side, as shown in block 182. The gripper identifier is then determined and used again in an ORIENT command to the gripper assembly, as shown in blocks 184 and 186. A PUT command message is then generated and sent to the gripper assembly to request it to put the data cartridge it is holding into cell B, as shown in block 188. The master library controller then determines whether the gripper PUT command was successfully completed, as shown in block 190. The MOVE cartridge process ends in block 192. Whenever an error is not resolvable by the intelligent library components, the master library controller may provide further error processing functions, as shown in block 137.

It may be instructive to provide exemplary command and response message formats and to provide additional description associated with the message formats and operations thereof.

The gripper command and response message packets may have the following exemplary data structure:

```
typedef struct
{
    uint8     action;
    uint8     angle;
    uint8     media;
    uint16    parameter1;
    uint16    parameter2;
} GRIPPER_COMMAND;
typedef struct
{
    uint8     status;
    uint16    parameter1;
    uint16    parameter2;
    uint16    parameter3;
} GRIPPER_RESPONSE;
```

In the data structure definition above, one-byte size is indicated as "uint8", which has eight bits; two bytes are indicated as "uint16", which have 16 bits. Characters, "char", are represented in eight bits, and may form a character string when listed as an array of characters.

The gripper command message packet may have five data items:

| Action | Angle | Media | Parameter1 | Parameter2 |
|--------|-------|-------|------------|------------|

The following gripper commands may be defined:

| Command | Value | Meaning |
|---------|-------|---------|
| INITIALIZE | 01 | Calibrate griper axis to determine location and state of gripper axis |
| HOME | 02 | Move gripper to a predetermined ZERO position |
| EXTEND | 03 | Extend gripper forward |
| RETRACT | 04 | Retract gripper backward |
| OPEN | 05 | Open gripper fingers |
| CLOSE | 06 | Close gripper fingers |
| PIVOT | 07 | Pivot (turn) gripper |
| GET | 08 | Move a cartridge from a location into the gripper |
| PUT | 09 | Move a cartridge from the gripper into a location |
| PUSH | 10 | Push a cartridge forward |
| TEST | 11 | Perform gripper test |

The gripper commands may have the following parameters:

| Action | Angle | Media | Parameter1 | Parameter2 |
|--------|-------|-------|------------|------------|
| 01 | N/A | N/A | N/A | N/A |
| 02 | N/A | N/A | N/A | N/A |
| 03 | N/A | N/A | Distance | N/A |
| 04 | N/A | N/A | Distance | N/A |
| 05 | N/A | N/A | N/A | N/A |
| 06 | N/A | N/A | N/A | N/A |
| 07 | Angle | N/A | N/A | N/A |
| 08 | Angle | Media type | Get distance | N/A |
| 09 | Angle | Media type | Put distance | N/A |
| 10 | Angle | Media type | Push distance | N/A |
| 11 | N/A | N/A | Test type | Expected result |

The gripper response message packet may have four data items:

| Status | Parameter1 | Parameter2 | Parameter3 |
|--------|------------|------------|------------|

The following table lists the possible status for the response message packet and the respective meaning:

| Status | Value | Meaning |
|--------|-------|---------|
| OK | 00 | Command completed successfully |
| FAIL | 01 | Command failed with non-specific failure |
| PIVOT FAIL | 02 | Pivot failed |
| REACH FAIL | 03 | Reach failed |
| OPEN FAIL | 04 | Open failed |
| CLOSE FAIL | 05 | Close failed |
| HOME FAIL | 06 | Gripper could not move to home position |
| TEST FAIL | 07 | Gripper test failed |

The gripper response message packets may have the following parameters:

| Status | Parameter1 | Parameter2 | Parameter3 |
|--------|------------|------------|------------|
| 00 | N/A | N/A | N/A |
| 01 | axis 1 | axis 2 | axis 3 |
| 02 | specific reason | N/A | sensor status |
| 03 | specific reason | distance | sensor status |
| 04 | specific reason | distance | sensor status |
| 05 | specific reason | distance | sensor status |
| 06 | specific reason | distance | sensor status |
| 07 | specific reason | sub-test | sensor status |

As another example, data storage tower command and response message packets may have the following structure:

```
typedef struct
{
    uint8     action;
    uint16    param1;
    uint16    param2;
    uint16    param3;
    char      volser[8];
} TOWER_COMMAND;
typedef struct
{
    uint8     status;
    uint16    param1;
    uint16    param2;
    uint16    param3;
    char      volser[8];
} TOWER_RESPONSE;
```

The tower command message packet may have five data items:

| Action | Parameter1 | Parameter2 | Parameter3 | Volser |
|--------|------------|------------|------------|--------|

The following tower commands may be defined:

| Action | Value | Meaning |
| --- | --- | --- |
| HOME | 01 | Determine and move tower to a predetermined ZERO position |
| ROTATE | 02 | Rotate to position |
| CONFIGURE | 03 | Receive configuration data |
| UP-LOAD | 04 | Receive Database information |
| DOWN-LOAD | 05 | Report Database information |
| STATUS | 06 | Report Configuration Status |
| TEST | 07 | Perform tower test |

The tower commands may require the following parameters:

| Action | Parameter1 | Parameter2 | Parameter3 | Volser |
| --- | --- | --- | --- | --- |
| 01 | N/A | N/A | N/A | N/A |
| 02 | Position | N/A | N/A | N/A |
| 03 | Row Numbers | Column Numbers | Media Type | N/A |
| 04 | Database Element | Database Status | Media Type | Bar-Code Label |
| 05 | Database Element | N/A | N/A | N/A |
| 06 | Config Valid | Tower Taught | Database Loaded | N/A |
| 07 | Test | Expected Result | N/A | N/A |

The tower response message packet may have five data items:

| Status | Parameter1 | Parameter2 | Parameter3 | Volser |
| --- | --- | --- | --- | --- |

The following table lists the tower return status and the respective meaning:

| Status | Value | Meaning |
| --- | --- | --- |
| OK | 00 | Command completed successfully |
| FAIL | 01 | Command failed with non-specific failure |
| ROTATE FAIL | 02 | Tower rotate failed |
| HOME FAIL | 03 | Tower could not move to home position |
| DB FAIL | 04 | Configuration or database information incorrect |
| TEST FAIL | 05 | Tower test failed |

The above tower responses may report the following parameters:

| Status | Parameter1 | Parameter2 | Parameter3 | Volser |
| --- | --- | --- | --- | --- |
| 00 | N/A | N/A | N/A | Bar-code label if requested |
| 01 | axis 1 | N/A | N/A | N/A |
| 02 | specific reason | N/A | sensor status | N/A |
| 03 | specific reason | location | sensor status | N/A |
| 04 | specific reason | element | N/A | N/A |
| 05 | specific reason | sub-test | sensor status | N/A |

Therefore, a received operator request gives rise to one or more commands intended for one or more intelligent library component. In general, the master library controller determines which data cartridge is involved in the operator request. It then issues command messages to the medium transport element to get the targeted cartridge. Movable data storage elements are also issued command messages to present the targeted cartridge or otherwise enable the medium transport element to access the targeted cartridge. The cartridge may simply be moved from one cell to another. The cartridge may also be loaded into a data transfer element for data access, ejected from the library, imported into the library, or subjected to other library functions.

Operating in this manner, the configuration of the distributed architecture of mass data storage library system may be expanded or otherwise changed without having to make substantial changes to the remaining portions of the system to accomplish the change. Further, with distributed processing, master library controller is operable to issue logically defined commands that can be interpreted by the intelligent library components instead of issuing specific electrical signals to specific I/O ports which are coupled to actuators, sensors, motors, and other subcomponents of the library components to effect movement and action. In this manner, the master library controller need not maintain intimate knowledge regarding the manner in which the intelligent library components perform certain tasks. One or more layers of abstraction is therefore created between the master library controller and the generation of electrical signals to create movement in the library system. These layers of abstraction further enhances the flexibility and scalability of the system. It is contemplated by the present invention that the various components of the library system may be linked by a network composed of electrical wiring, optical fiber, radio signals, or other means of communicating data.

It is contemplated by the present invention to incorporate the operator interface functionality into the master library controller. In this embodiment, the master library controller includes a display and a means for the operator to enter operator requests. It is further contemplated by the present invention that the operator interface may include a remotely located operator interface which is still operable to communicate with the master library controller via the network or by other electronic communications means.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method, in a single mass data storage library, of distributing the processing of a request from an operator, wherein the mass data storage library includes multiple individual and operable library components, comprising:

receiving the operator request over a network at a single library controller;

determining two or more individual library component subcommands from the operator request via the library controller;

forming two or more command messages to be transmitted to the individual library components, wherein each command message comprises one or more subcommands suitable to be executed by one of the intelligent library components, wherein the multiple individual library components are coupled among the single library controller via the network;

simultaneously transmitting each command message over the network to specific individual library components;

interpreting each transmitted command message at corresponding specific individual library components in order to extract subcommands contained in the command message; and processing the subcommands at each of the corresponding specific library components in order to carry out the operator request.

2. The method of claim 1, wherein processing the operator request further comprises determining at least one parameter associated with each subcommand.

3. The method of claim 1, further comprising receiving at least one reply message from one or more of the individual library components indicative of receiving a subcommand.

4. The method of claim 1, wherein receiving the operator request comprises receiving a MOVE CARTRIDGE operator request.

5. The method of claim 4, wherein receiving the MOVE CARTRIDGE operator request comprises receiving origin and destination parameters.

6. The method of claim 5, wherein the MOVE CARTRIDGE operator request comprises:
a PRESENT CARTRIDGE subcommand applicable to a movable data storage element;
a GET CARTRIDGE subcommand applicable to a medium transport element; and
a PUT CARTRIDGE subcommand applicable to the medium transport element.

7. The method of claim 6, wherein the GET CARTRIDGE subcommand comprises determining a type of data medium.

8. The method of claim 6, wherein the GET CARTRIDGE subcommand comprises determining a data cartridge location specified by the origin parameter.

9. The method of claim 6, wherein the PUT CARTRIDGE subcommand comprises determining an unoccupied location specified by the destination parameter.

10. The method of claim 1, wherein the individual library components can operate in parallel when carrying out the operator request.

11. A method, in a single distributed processing mass data storage library, of commanding operation of multiple individual library components, comprising:

receiving an operator request at a single library controller;

processing the operator request into two or more command messages, wherein each command message is suitable to be read and understood by one or more individual library components coupled to the single library controller via a network and, further, wherein each command message comprises one or more individual library component subcommands derived from the operator request;

simultaneously transmitting, from the master library controller, each command message to two or more corresponding individual library components configured to receive command messages;

processing received command messages at each of the corresponding individual library components in order to extract one or more subcommands from each received command message; and processing the extracted subcommands at each of the corresponding individual library components in order to carry out the operator request.

12. The method of claim 11, wherein processing the operator request further comprises determining at least one parameter associated with the one or more subcommands related to the operator request.

13. The method of claim 11, further comprising receiving at least one reply message from one or more individual library components indicative of receiving a subcommand.

14. The method of claim 11, wherein receiving the operator request comprises receiving a MOVE CARTRIDGE operator request.

15. The method of claim 14, wherein receiving the MOVE CARTRIDGE operator request comprises receiving origin and destination parameters.

16. The method of claim 15, wherein the MOVE CARTRIDGE operator request comprises:
a PRESENT CARTRIDGE subcommand applicable to an individual data storage element;
a GET CARTRIDGE subcommand applicable to an individual medium transport element; and
a PUT CARTRIDGE subcommand applicable to the individual medium transport element.

17. The method of claim 16, wherein the GET CARTRIDGE subcommand comprises determining a type of data medium.

18. The method of claim 16, wherein the GET CARTRIDGE subcommand comprises determining a data cartridge location specified by the origin parameter.

19. The method of claim 16, wherein the PUT CARTRIDGE subcommand comprises determining an unoccupied location specified by the destination parameter.

20. The method of claim 11, wherein the individual library components can operate in parallel when carrying out the operator request.

* * * * *